United States Patent
Gustafsson et al.

(10) Patent No.: US 11,258,831 B2
(45) Date of Patent: Feb. 22, 2022

(54) LI FOR MOBILITY IN S8HR

(71) Applicant: Telefonaktiebolaget LM Ericsson (publ), Stockholm (SE)

(72) Inventors: Roland Gustafsson, Bengtsfors (SE); Maurizio Iovieno, Salerno (IT); Ralf Keller, Würselen (DE); Patrik Dannebro, Hisings Kärra (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 517 days.

(21) Appl. No.: 15/311,259

(22) PCT Filed: Oct. 26, 2016

(86) PCT No.: PCT/EP2016/075750
§ 371 (c)(1),
(2) Date: Nov. 15, 2016

(87) PCT Pub. No.: WO2018/001537
PCT Pub. Date: Jan. 4, 2018

(65) Prior Publication Data
US 2018/0227750 A1    Aug. 9, 2018

Related U.S. Application Data

(60) Provisional application No. 62/356,919, filed on Jun. 30, 2016.

(51) Int. Cl.
*H04W 12/80* (2021.01)
*H04L 29/06* (2006.01)
(Continued)

(52) U.S. Cl.
CPC ........ *H04L 63/306* (2013.01); *H04L 65/1016* (2013.01); *H04W 8/08* (2013.01);
(Continued)

(58) Field of Classification Search
CPC ....... H04W 12/02; H04W 92/02; H04W 8/08; H04W 12/80; H04W 36/0038;
(Continued)

(56) References Cited

U.S. PATENT DOCUMENTS 8,191,116 B1 * 5/2012 Gazzard ................. H04L 63/08
                                                                       726/4
8,260,258 B1 * 9/2012 Li ....................... H04L 65/1076
                                                                    455/410
(Continued)

FOREIGN PATENT DOCUMENTS

CN    101296504 A    10/2008
WO    0056029 A1    9/2000
(Continued)

OTHER PUBLICATIONS

Author Unknown, "Technical Specification Group Services and Systems Aspects; Study on providing for LI in the S8 Home Routing architecture for VoLTE (Release 14)," Technical Report 33.827, Version 1.0.0, 3GPP Organizational Partners, Sep. 2016, 53 pages.

(Continued)

*Primary Examiner* — Nimesh Patel
(74) *Attorney, Agent, or Firm* — Withrow & Terranova, PLLC

(57) ABSTRACT

This invention is related to S8 Home Routing (S8HR), under specification by the Global System for Mobile Communications (GSM) Association (GSMA) and $3^{rd}$ Generation Partnership Project (3GPP).
In a first aspect of the invention, a method is provided for enabling Lawful Interception (LI) when a wireless communication terminal performs S8HR roaming. The method comprises receiving, at a first LMISF from a first SGW serving the wireless communication terminal, IMS-related information of the wireless communication terminal required for performing LI, and providing, from the first (Continued)

LMISF upon the wireless communication terminal relocating to a second SGW serving the wireless communication terminal, the received IMS-related information of the wireless communication terminal required for performing LI, to a second LMISF associated with the second SGW.

20 Claims, 11 Drawing Sheets

(51) Int. Cl.
| | |
|---|---|
| *H04W 36/00* | (2009.01) |
| *H04L 65/1016* | (2022.01) |
| *H04W 8/08* | (2009.01) |
| *H04L 65/10* | (2022.01) |
| *H04W 92/02* | (2009.01) |

(52) U.S. Cl.
CPC ....... *H04W 12/80* (2021.01); *H04W 36/0033* (2013.01); *H04W 36/0038* (2013.01); *H04L 65/1006* (2013.01); *H04W 92/02* (2013.01)

(58) Field of Classification Search
CPC . H04W 36/0033; H04W 88/06; H04W 76/27; H04W 88/16; H04W 76/10; H04W 48/18; H04W 48/16; H04W 12/75; H04W 36/0058; H04W 36/0085; H04W 92/10; H04W 60/00; H04W 8/04; H04W 8/20; H04L 65/1016; H04L 63/306; H04L 63/30; H04L 63/304; H04L 63/00; H04L 65/1006; H04L 12/407; H04L 12/14; H04L 65/1083; H04L 43/0817; H04L 63/0876; H04L 67/148; H04L 29/06; H04L 5/0055; H04L 61/054; H04L 1/1812; H04L 65/104; H04L 12/189; H04L 1/1861; H04L 65/102; H04L 65/1066; H04M 3/2281; H04M 15/85; H04M 15/57; H04M 15/8038; H04M 3/00; H04M 2207/185; H04M 15/55; H04M 15/56

See application file for complete search history.

(56) References Cited

U.S. PATENT DOCUMENTS

| | | | |
|---|---|---|---|
| 2006/0268921 A1* | 11/2006 | Ekstrom | H04W 12/80 370/437 |
| 2007/0091849 A1* | 4/2007 | Park | H04W 36/0016 370/331 |
| 2009/0074156 A1* | 3/2009 | Ku | H04L 63/306 379/35 |
| 2009/0270099 A1* | 10/2009 | Gallagher | H04W 8/08 455/435.1 |
| 2010/0080127 A1 | 4/2010 | Yin et al. | |
| 2011/0103310 A1 | 5/2011 | Stojanovski et al. | |
| 2012/0051323 A1 | 3/2012 | Wolfner et al. | |
| 2012/0189016 A1 | 7/2012 | Bakker et al. | |
| 2013/0064158 A1 | 3/2013 | Sundell et al. | |
| 2015/0085828 A1 | 3/2015 | Chen | |
| 2015/0365980 A1* | 12/2015 | Meng | H04W 76/50 455/404.1 |
| 2017/0064544 A1* | 3/2017 | Youn | H04W 12/02 |
| 2018/0006953 A1* | 1/2018 | Power | H04L 12/1407 |

FOREIGN PATENT DOCUMENTS

| | | |
|---|---|---|
| WO | 2010000310 A1 | 1/2010 |
| WO | 2010039071 A | 4/2010 |

OTHER PUBLICATIONS

Ericsson, "Draft S3i160325r1: P-CR proposing text for Key Issue #5 to LIV Study," 3rd Generation Partnership Project (3GPP), SA WG3LI Meeting #62, Jul. 18-21, 2016, 2 pages, Sophia Antipolis, France.

International Search Report and Written Opinion for International Patent Application No. PCT/EP2016/075750, dated Apr. 4, 2017, 17 pages.

Author Unknown, "IMS Roaming and Interworking Guidelines," Official Document IR.65, Version 20.0, Jun. 7, 2016, GSM Association, pp. 1-56.

Author Unknown, "Technical Specification Group Services and Systems Aspects; Study on Providing for LI in the 3S Home Routing Architecture for VoLTE (Release 14)," Technical Report 33.827, Version 0.1.0, 3GPP Organizational Partners, May 2016, 24 pages.

Author Unkown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.6.1, 3GPP Organizational Partners, Mar. 2016, 365 pages.

Author Unkown, "Technical Specification Group Core Network and Terminals; 3GPP Evolved Packet System EPS); Evolved General Packet Radio Service (GPRS) Tunnelling Protocol for Control plane (GTPv2-C); Stage 3 (Release 13)," Technical Specification 29.274, Version 13.5.0, 3GPP Organizational Partners, Mar. 2016, 348 pages.

Tanaka, Itsuma, "VoLTE Roaming and Interconnection Standard Technology," Technology Reports, vol. 15, Issue 2, 2013, NTT Docomo, Inc., pp. 37-41.

First Office Action for Chinese Patent Application No. 201680087131. 5, dated Jun. 25, 2021, 24 pages.

Search Report for Japanese Patent Application No. 2018-568933, dated Oct. 9, 2019, 29 pages.

Notice of Reasons for Refusal for Japanese Patent Application No. 2018-568933, dated Oct. 15, 2019, 6 pages.

Official Action for Russian Patent Application No. 2019102420/08(004301), dated Sep. 23, 2019, 15 pages.

\* cited by examiner (Prior Art –LBO)

(Prior Art – S8HR)

LI FOR MOBILITY IN S8HR

TECHNICAL FIELD

This invention is related to S8 Home Routing (S8HR), under specification by the Global System for Mobile Communications (GSM) Association (GSMA) and 3rd Generation Partnership Project (3GPP).

BACKGROUND

The GSMA is specifying a new architecture for Voice Over Long Term Evolution (VoLTE) roaming, called S8 Home Routing (S8HR) [1]. FIG. 1A shows the already existing Internet Protocol (IP) Multimedia Subsystem (IMS) roaming architecture, known as Local Break-Out (LBO), and FIG. 1B shows the newer S8HR roaming architecture. FIGS. 1A and 1B show the interaction of network elements within a Home Public Land Mobile Network (HPLMN) 10 and a Visited Public Land Mobile Network (VPLMN) 12.

FIG. 1A illustrates a conventional LBO configuration. As shown in FIG. 1A, in LBO, a Proxy Call/Session Control Function (P-CSCF) 14 and Packet Gateway (PGW) 16 used for the Packet Data Network (PDN) connection to the Evolved Packet Core (EPC) are both in the VPLMN. The P-CSCF 14 communicates with a Serving Call/Session Control Function (S-CSCF) 18 located in the HPLMN.

In FIG. 1A, a User Equipment (UE) 20 connects to the network via a Signaling Gateway (SGW) 22, which sends bearer traffic through the PGW 16 and the P-CSCF 14 within the VPLMN 12 to the S-CSCF 18 located within the HPLMN 10. The P-CSCF 14 and the S-CSCF 18 are functional entities within an IMS. Because the P-CSCF 14 is able to "see" the IMS/Session Initiation Protocol (SIP) identities, it can perform Lawful Interception (LI) functions within the VPLMN 12. In LBO, there is no change of P-CSCF 14 due to mobility. Mobility is handled by the SGW 22 (and a Mobility Management Entity (MME)). Because LI is done in the P-CSCF 14, UE mobility has no effect on the LI functions executed by the P-CSCF 14.

FIG. 1B illustrates a conventional S8HR configuration. As shown in FIG. 1B, S8HR differs from LBO in that both the P-CSCF 14 and the PGW 16 are in the HPLMN 10, rather than in the VPLMN 12, and the PGW 16 communicates with the VPLMN 12 via a S8 interface. In S8HR, the only core network node in the VPLMN 12 involved in the communication path bearing the IMS VoLTE call is the SGW 22: that is, no IMS nodes within the VPLMN 12 are involved with a VoLTE roaming call.

This has implications in terms of LI in the VPLMN 12, because in S8HR, there is no IMS node within the VPLMN which can be used to intercept VoLTE related information, such as calling/called party numbers. In several countries this has regulatory implications, because the Operator, who is providing a voice service, based on a roaming agreement with the home operator, may have a legal requirement to intercept the voice calls to or from the IMS subscriber, it this is target for interception. Third Generation Partnership Project (3GPP) TSG SA WG3-LI is working on a Technical Report (TR) [2] to define functional requirements and LI architecture to allow interception of the VoLTE call in the VPLMN.

The operation of the LI components is as follows: when an IMS VoLTE bearer is detected in the SGW 22/Bearer Binding Intercept and Forwarding Function (BBIFF) 24, the General Packet Radio Service (GPRS) Tunneling Protocol (GTP) bearers are provided to a Lawful Interception (LI) Mirror IMS State Function (LMISF) 26 via a Xia interface. The LMISF 26 is able to extract the IMS signaling from the GTP bearers. If the LMISF 26 receives a request, via a X1 interface, to intercept a voice call, the LMISF 26 will notify a LI Policy Control Function (LPCF) 28 and provide information that maps LI targets to GTP tunnel identifiers. The LPCF 28 will respond by sending policy instructions to the SGW 22/BBIFF 24. In response to receiving the policy instructions, the SGW 22/BBIFF 24 may begin sending general content of communication, including IMS content, to an appropriate Delivery Function (DF), such as the DF3 30, via an X3 interface. The LMISF 26 may begin sending copies of the voice call SIP messages to an appropriate DF, such as the DF2 32, via an X2 interface.

In the LI architecture proposed in [2] and shown in FIG. 1B, the SGW 22 identifies bearers related to VoLTE by checking parameters such as Access Point Name (APN) and Quality of Service (QoS) Class Identifier (QCI) and provides these bearers to the LMISF 26, which then checks whether the involved IMS identities are targets for interception. As the UE 20 changes location, the SGW that serves the UE 20 may change, e.g., the UE 20 may move from a donor SGW, such as SGW 22, to a receptor SGW (not shown in FIG. 1B). When this happens, the LMISF associated with the receptor SGW may be different than the LMISF 26 associated with the donor SGW 22. This is represented graphically in FIG. 2.

In FIG. 2, the UE 20 is initially served by a SGW/BBIFF, e.g., SGW1 22/BBIFF1 24, which is hereinafter referred to as the "donor SGW1 22" and which provides IMS-related information to a first LMISF, e.g., the LMISF1 26, which is hereinafter referred to as the "donor LMISF1 26", over an X1a interface. The donor LMISF1 26 analyzes the IMS-related information. Based on that analysis, the donor LMISF1 26 is able to recover SIP signaling and may start sending intercepted SIP messages over the X2 interface to a DF, such as DF 32. The UE 20 then changes from the donor SGW1 to a second SGW/BBIFF, e.g., the SGW2 34/BBIFF2 36, which is hereinafter referred to as the "receptor SGW2." The receptor SGW2 is associated with a second LMISF, e.g., LMISF2, which is hereinafter referred to as the "receptor LMISF2 38." The receptor SGW2 34 will provide IMS-related information to the receptor LMISF2 38 over another X1a interface. It is noted that in [5], being a more recent version of [2], an enhanced architecture has been proposed and recommended by SA3-LI. In this new architecture the change affects interception of the content of communication, so that the SGW 22 does not provide the content over X3 to the DF3 30 but also sends the content to the LMISF 26 which in turn (in case the user is a target of interception) will send the content to DF3 30 over X3. This change does not affect the proposed solution discussed herein.

However, a problem with prior art S8HR roaming is that it will not be possible for the receptor LMISF2 38 to get access to IMS related information previously collected by the donor LMISF1 26, as the receptor LMISF2 38 did not receive the information when the VoLTE call was started and because there is no mechanism for this information to be transferred from one LMISF to another LMISF.

SUMMARY

An object of the present invention is to solve, or at least mitigate, this problem in the art and thus to enable LI when a wireless communication terminal performs S8HR roaming.

The problems above could be solved by allowing the transfer of Internet Protocol (IP) Multimedia Subsystem (IMS) information from a donor, i.e. a first, LMISF to a receptor, i.e. a second, LMISF as needed when a Signaling Gateway (SGW) relocation occurs. Methods and systems for allowing such transfer are provided herein.

This object is attained in a first aspect of the invention by a method of enabling LI when a wireless communication terminal performs S8HR roaming. The method comprises receiving, at a first LMISF from a first SGW serving the wireless communication terminal, IMS-related information of the wireless communication terminal required for performing LI, and providing, from the first LMISF upon the wireless communication terminal relocating to a second SGW serving the wireless communication terminal, the received IMS-related information of the wireless communication terminal required for performing LI, to a second LMISF associated with the second SGW.

This object is attained in a second aspect of the invention by a first LMISF configured to enable LI when a wireless communication terminal performs S8 Home Routing roaming, which first LMISF comprises a processor and a memory, said memory containing instructions executable by said processor, whereby the first LMISF is operative to receive, from a first SGW serving the wireless communication terminal, IMS-related information of the wireless communication terminal required for performing LI, and provide, upon the wireless communication terminal relocating to a second SGW serving the wireless communication terminal, the received IMS-related information of the wireless communication terminal required for performing LI, to a second LMISF associated with the second SGW.

This object is attained in a third aspect of the invention by a method of enabling LI when a wireless communication terminal performs S8 Home Routing roaming. The method comprises receiving, at an MME from a first SGW, an address of a first LMISF serving the wireless communication terminal, and providing, from the MME via a second SGW to a second LMISF to which the wireless communication terminal is relocated, the address of the first LMISF, wherein IMS-related information of the wireless communication terminal required for performing LI can be acquired by the second LMISF from the first LMISF.

This object is attained in a fourth aspect of the invention by an MME configured to enable LI when a wireless communication terminal performs S8 Home Routing roaming, which MME comprises a processor and a memory, said memory containing instructions executable by said processor, whereby the MME is operative to receive, from a first SGW, an address of a first LMISF serving the wireless communication terminal, and provide, via a second SGW to a second LMISF to which the wireless communication terminal is relocated, the address of the first LMISF, wherein IMS-related information of the wireless communication terminal required for performing LI can be acquired by the second LMISF from the first LMISF.

This object is attained in a fifth aspect of the invention by a method of enabling LI when a wireless communication terminal performs S8 Home Routing roaming. The method comprises receiving, at an MME serving the wireless communication terminal, an address of a first LMISF serving the wireless communication terminal, and providing, from the serving MME via another MME to which the wireless communication terminal is to be relocated to a second LMISF serving the wireless communication terminal after the relocation, the address of the first LMISF, wherein IMS-related information of the wireless communication terminal required for performing LI can be acquired by the second LMISF from the first LMISF.

This object is attained in a sixth aspect of the invention by an MME serving a wireless communication terminal, configured to enable LI when the wireless communication terminal performs S8 Home Routing roaming, which MME comprises a processor and a memory, said memory containing instructions executable by said processor, whereby the MME is operative to receive an address of a first LMIS, serving the wireless communication terminal, and provide, via another MME to which the wireless communication terminal is to be relocated to a second LMISF serving the wireless communication terminal after the relocation, the address of the first LMISF, wherein IMS-related information of the wireless communication terminal required for performing LI can be acquired by the second LMISF from the first LMISF.

This object is attained in a seventh aspect of the invention by a method of enabling LI when a wireless communication terminal performs S8 Home Routing roaming. The method comprises receiving, at a second LMISF to which the wireless communication terminal is relocated, an address of a first LMISF that served the wireless communication terminal before the relocation, from an MME serving the second LMISF via an SGW associated with the second LMISF; and acquiring, from the first LMISF, IMS-related information of the wireless communication terminal required for performing LI.

This object is attained in an eighth aspect of the invention by a second LMISF configured to enable LI when a wireless communication terminal performs S8 Home Routing roaming, which second LMISF comprises a processor and a memory, said memory containing instructions executable by said processor, whereby the second LMISF is operative to receive an address of a first LMISF that served the wireless communication terminal before relocation of the wireless communication terminal to the second LMISF, from an MME serving the second LMISF via an SGW associated with the second LMISF, and acquire, from the first LMISF, IMS-related information of the wireless communication terminal required for performing LI.

Embodiments disclosed herein utilize a new interface, Lm, by which User Equipment (UE) context and other UE-related information may be transferred from a donor LMISF to a receptor LMISF. In addition, the subject matter herein describes extensions/enhancements to existing procedures in order to implement the desired ability to perform or continue to perform vital LI functions even when a roaming UE migrates to a new SGW, LMISF, and/or Mobility Management Entity (MME).

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1A:
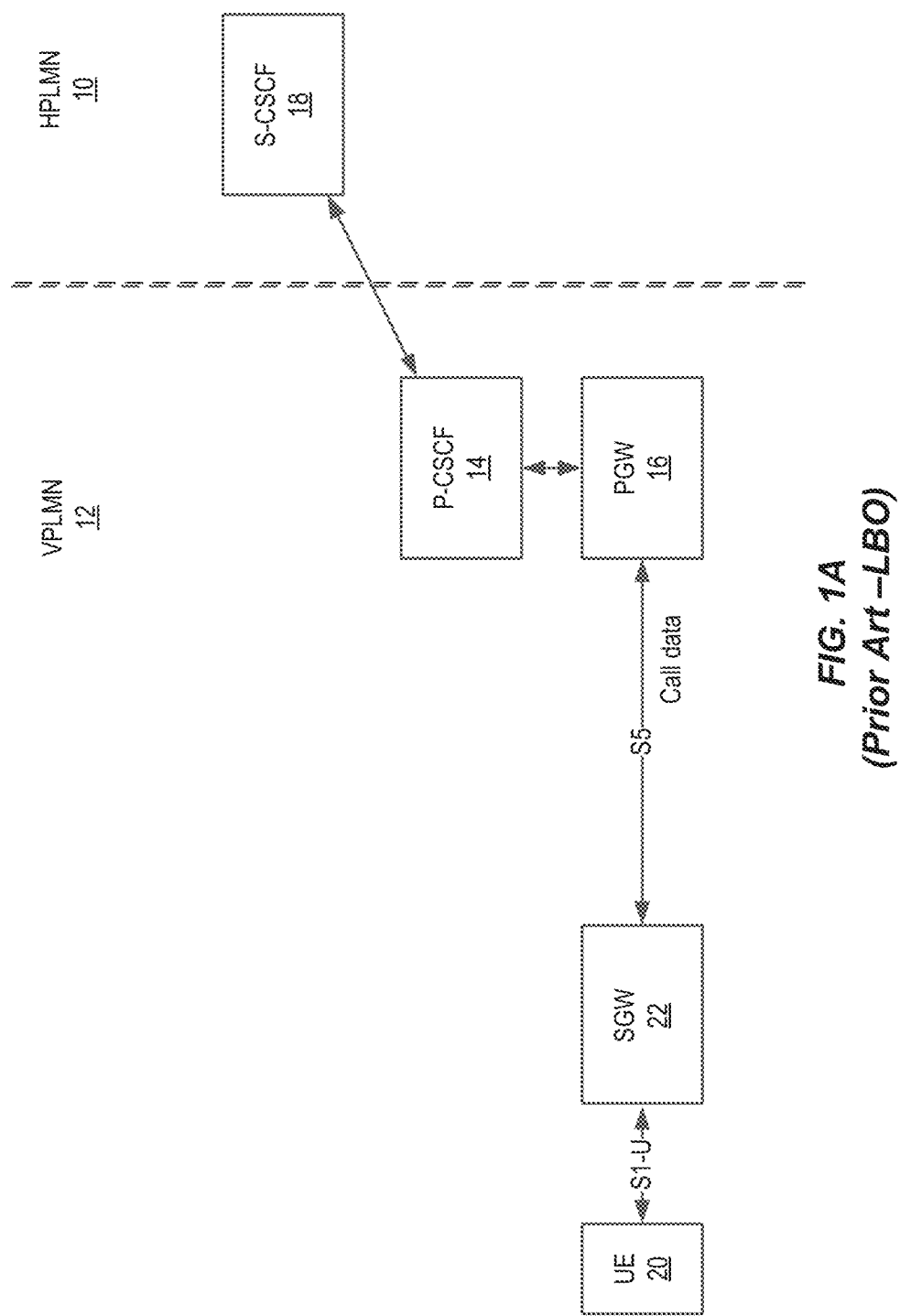
FIG. 1A illustrates one conventional Voice Over Long Term Evolution (VoLTE) implementation referred to as Local Break-Out (LBO).
Figure 1B:
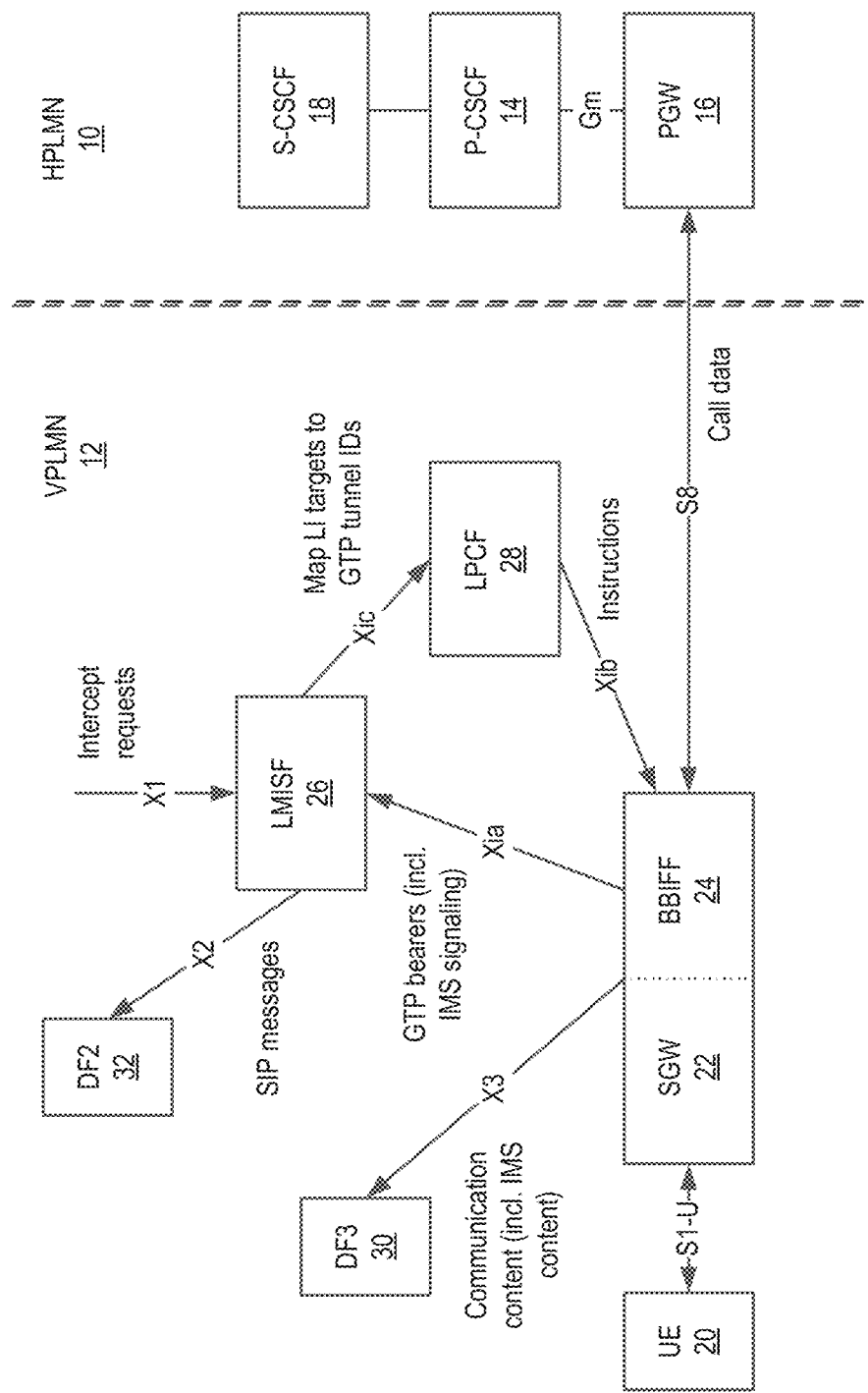
FIG. 1B illustrates another conventional VoLTE implementation referred to as S8 Home Routing (S8HR) with Bearer Binding Intercept and Forwarding Function (BBIFF) target General Packet Radio Service (GPRS) Tunneling Protocol (GTP) tunnel extraction.
Figure 2:
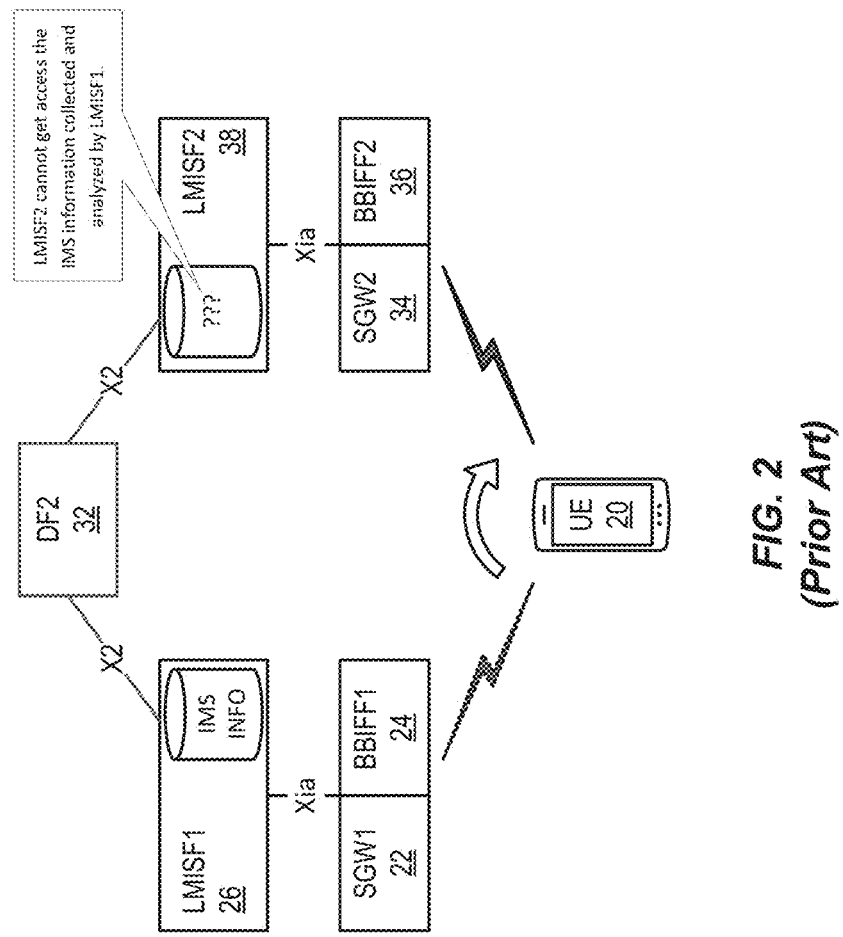
FIG. 2 illustrates a Serving Gateway (SGW) transfer with LMISF change in a conventional S8HR implementation.
Figure 3A:
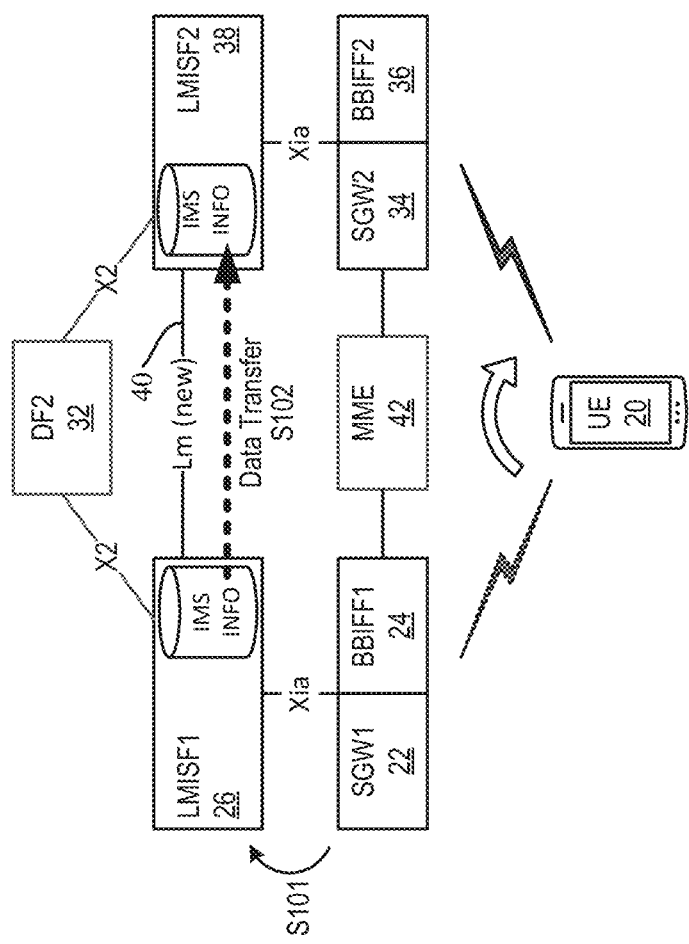
FIG. 3A illustrates an SGW transfer with a Lawful Interception (LI) Mirror Internet Protocol (IP) Multimedia Subsystem (IMS) State Function (LMISF) change according to an embodiment of the subject matter described herein, using an inter-LMISF interface to retrieve User Equipment (UE) context and IMS information.

FIG. 3A illustrates a solution to the problems described above according to one embodiment. FIG. 3A shows that when the User Equipment (UE) 20 relocates from a first Serving Gateway (SGW), i.e. the donor SGW, SGW1 22 to a second SGW, i.e. the receptor SGW, SGW2 34, the Internet Protocol (IP) Multimedia Subsystem (IMS)-related information—received from the donor SGW1 22 in step S101—that was stored and analyzed by a first Lawful Interception (LI) Mirror IMS State Function (LMISF), i.e. the donor LMISF, LMISF1 26 may be transferred as illustrated with step S102 to a second LMISF, i.e. the receptor LMISF, LMISF2 38, via a newly-defined interface, referred to herein as the Lm interface 40. Because the receptor LMISF2 38 has access to the IMS information previously collected by the donor LMISF1 26, the receptor LMISF2 38 can continue the activities and analysis that was being performed by the donor LMISF1 26. In FIG. 3A, both the donor LMISF1 26 and the receptor LMISF2 38 send data over an X2 interface to the same Delivery Function (DF) (e.g., the DF2 32), but this does not have to be the case.

Figure 3B:
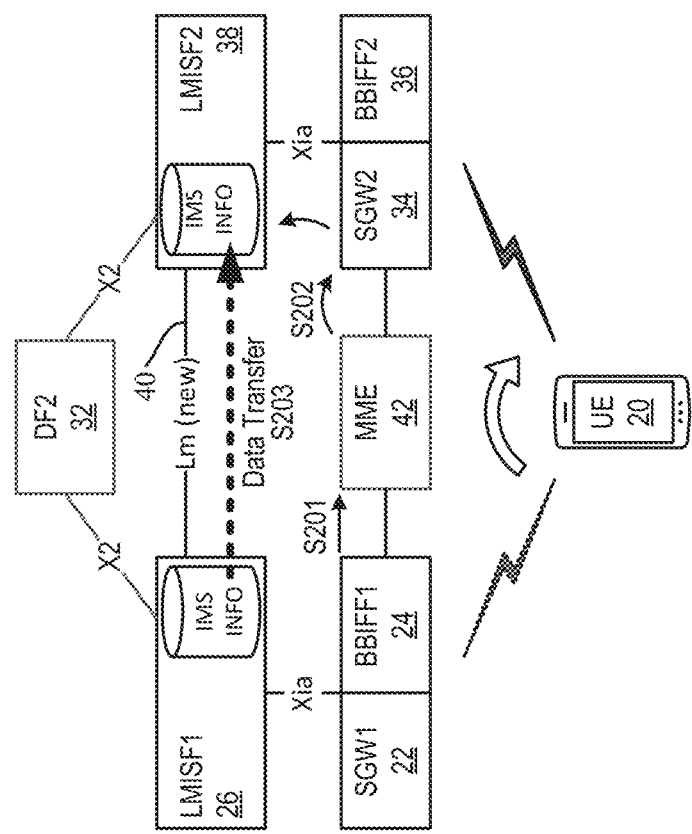
FIG. 3B illustrates an SGW transfer with a Lawful Interception (LI) Mirror Internet Protocol (IP) Multimedia Subsystem (IMS) State Function (LMISF) change according to another embodiment of the subject matter described herein, using an inter-LMISF interface to retrieve User Equipment (UE) context and IMS information.

In one embodiment illustrated with reference to FIG. 3B, providing this capability within S8 Home Routing (S8HR) can be accomplished by enhancing the SGW relocation procedure, which is controlled by a Mobility Management Entity (MME) 42 When an SGW relocation occurs, e.g., from the donor SGW1 22 to the receptor SGW2 34, the MME 42, which controls the SGW relocation, will provide the receptor SGW2 34 with the address of the donor LMISF1 26, as illustrated in step S202, which had been provided to the MME 42 by the donor SGW1 22 as part of a UE context as illustrated in step S201. This allows the receptor LMISF2 38 to contact the donor LMISF1 26 over the new Lm interface 40 and retrieve the needed information as illustrated in step S203.

Figure 3C:
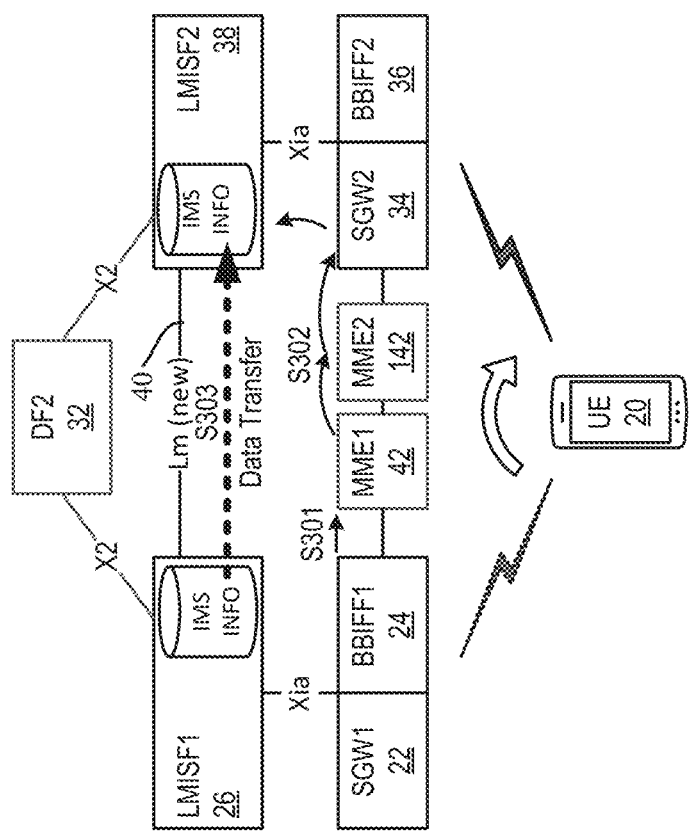
FIG. 3C illustrates an MME transfer with a Lawful Interception (LI) Mirror Internet Protocol (IP) Multimedia Subsystem (IMS) State Function (LMISF) change according to an embodiment of the subject matter described herein, using an inter-LMISF interface to retrieve User Equipment (UE) context and IMS information.

Likewise, as is shown in the embodiment illustrated in FIG. 3C, if the MME 42, being the serving MME, is also relocated, the address of the donor LMISF1 26 is transferred, as part of the UE context, from the donor MME 42 to a receptor MME 142. The UE context includes the set of signaling and data radio bearers that have been allocated for use by the UE. Thus, the donor MME 42, which controls the relocation, will provide the receptor MME 142 with the address of the donor LMISF1 26, as illustrated in step S302, which had been provided to the donor MME 42 by the donor SGW1 22 as part of a UE context as illustrated in step S301. This allows the receptor LMISF2 38 to contact the donor LMISF1 26 over the new Lm interface 40 and retrieve the needed information as illustrated in step S303.

The proposed solution would allow transferring the information about the established Voice Over Long Term Evolution (VoLTE) call, available at the donor LMISF1 26, to the receptor LMISF2 38 connected to a different SGW in case the target for interception undergoes a SGW relocation (and even to a different MME in case the target for interception undergoes an MME relocation). This allows the continuity of interception of the ongoing VoLTE call after the SGW relocation. The same principles may be extended to handle MME relocation.

Figure 4A:
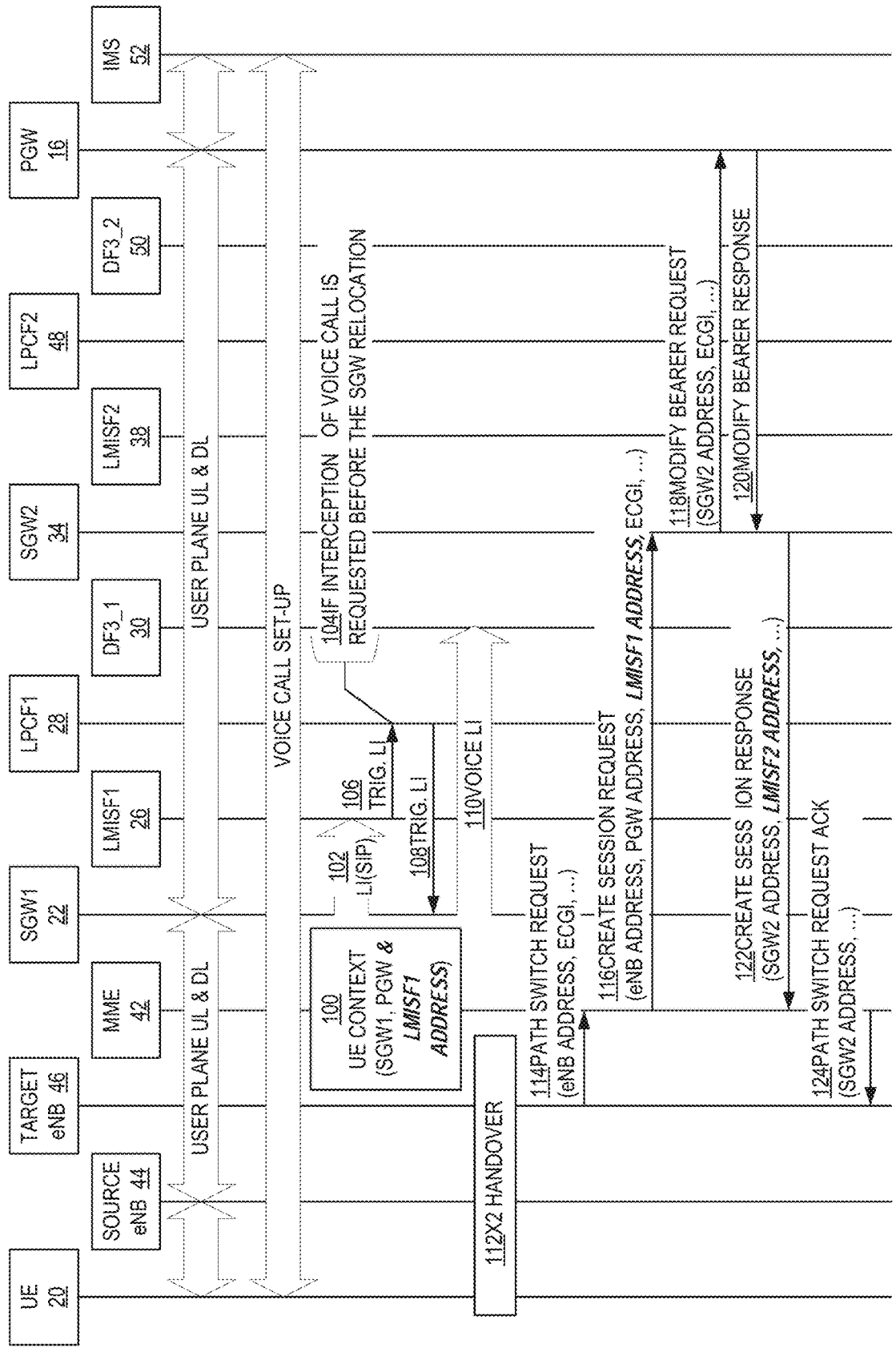
FIGS. 4A and 4B are signaling message flow diagrams illustrating messages exchanged during the operation of a system for providing LI for mobility in S8HR according to an embodiment of the subject matter described herein.
Figure 4B:
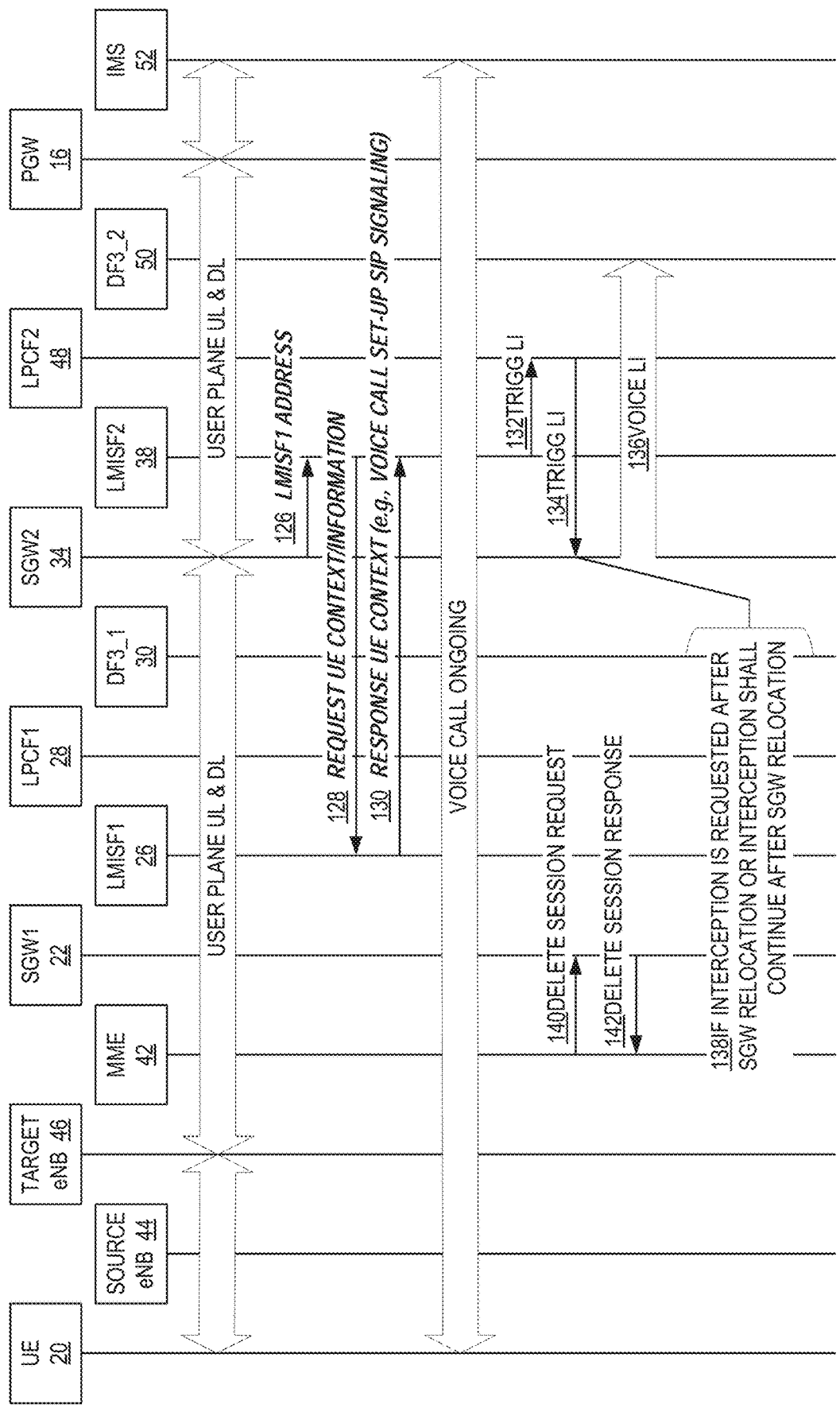

FIGS. 4A and 4B illustrate the changes needed to the current SGW relocation procedure, specified in [4], in order to provide the solution described herein according to one embodiment. The modifications to the steps are highlighted using underlining in the text below. In the embodiment illustrated in FIG. 4A, after the UE 20 has connected to the Evolved Packet Core (EPC) network, the MME 42 stores the address of the donor LMISF, LMISF1 26, provided by the donor SGW, SGW 22, as part of a UE context (procedure 100). When the IMS bearer is detected in SGW 22, the bearer is provided to the LMISF1 26 (data flow 102).

If, before a relocation occurs, interception of a voice call is requested (event 104), the LMISF1 26 will notify a first LI Policy Control Function (LPCF), LPCF1 28, (message 106) including information that maps LI targets to General Packet Radio Service (GPRS) Tunneling Protocol (GTP)

tunnel identifiers. The LPCF1 28 will respond by sending policy instructions (message 108) to the donor SGW, SGW1 22. In response to receiving the policy instructions, the donor SGW1 22 may begin sending IMS content (data stream 110) to an appropriate delivery function, such as the DF3_1 30, via an X3 interface. Although not shown in FIG. 4A, the LMISF1 26 may send copies of the voice call Session Initiation Protocol (SIP) messages to an appropriate delivery function, such as the DF2, via an X2 interface.

If an SGW relocation occurs, a X2 handover (procedure 112) is initiated. A target Enhanced Node B (eNodeB or eNB) 46 issues a path switch request (message 114) to the MME 42. In response, the MME 42 issues a create session request (message 116) to the receptor SGW, SGW2 34. This request will provide the SGW2 34 with the address of the donor LMISF, LMISF1 26. In the embodiment illustrated in FIG. 4A, the receptor SGW, SGW2 34, issues a modify bearer request (message 118) to the Packet Gateway (PGW) 16, which responds by issuing a modify bearer response (message 120). The SGW2 34 will then send to the MME 42 a create session response (message 122) that includes the address of the LMISF2 38. The MME 42 then sends a path switch request acknowledge (message 124) to the target eNB 46.

In the embodiment illustrated in FIG. 4B, once the user plane uplink and downlink have been set up as part of the SGW relocation procedure, the SGW2 34 will provide the LMISF2 38 with the address of the LMISF1 26 (message 126). In order to ensure continuity of interception, the LMISF2 38 stores the uplink and downlink user plane. This will allow the LMISF2 38 to contact the LMISF1 26 (message 128) over the Lm interface 40 and retrieve the IMS related information (message 130). The LMISF2 38 will then have all the IMS related information to check if the transferred bearer refers to an IMS target for interception.

The LMISF2 38 uses the retrieved IMS related information to detect a target for LI, and notifies the LPCF2 48 (message 132), which responds by sending instructions to the SGW2 34 (message 134) to being providing voice data to the DF3_2 50 (data stream 136). This process may occur because LI is requested after the SGW relocation or because the interception continues after the SGW relocation (process 138). Meanwhile, the previous session between the MME 42 and the SGW1 22 is dismantled (message 140, message 142).

Figure 5A:
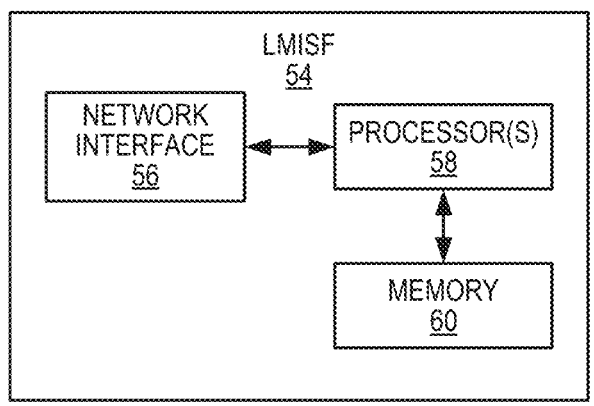
FIG. 5A is a block diagram illustrating an exemplary LMISF according to an embodiment of the subject matter described herein.

FIG. 5A is a block diagram illustrating an exemplary LMISF according to an embodiment of the subject matter described herein, i.e. first LMISF1 26 and second LMISF2 38. In the embodiment illustrated in FIG. 5A, a LMISF 54 includes a network interface 56 for communicating with a telecommunications network, one or more processors 58, and memory 60. Memory 60 may store instructions to be executed by the one or more processors 58, causing them to perform the functions described herein. The new Lm interface 40 may use the physical and logical components of the network interface 56.

Figure 5B:
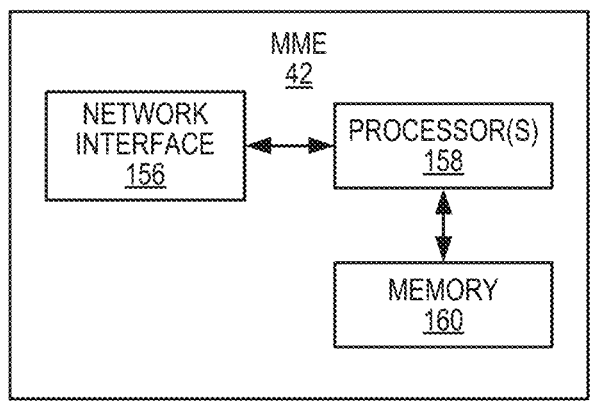
FIG. 5B is a block diagram illustrating an exemplary MME according to an embodiment of the subject matter described herein.

FIG. 5B is a block diagram illustrating an exemplary MME according to an embodiment of the subject matter described herein. In the embodiment illustrated in FIG. 5B, an MME 42 includes a network interface 156 for communicating with a telecommunications network, one or more processors 158, and memory 160. Memory 160 may store instructions to be executed by the one or more processors 158, causing them to perform the functions described herein.

Figure 6:
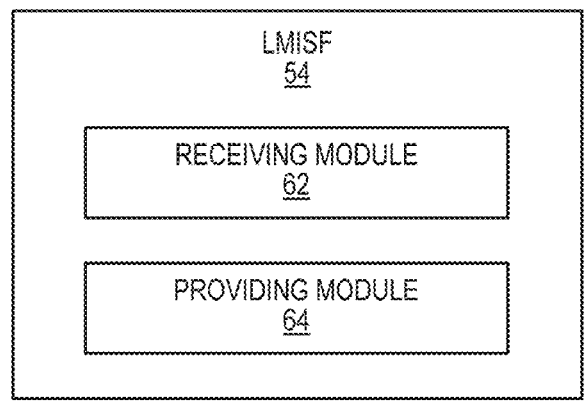
FIG. 6a is a block diagram illustrating an exemplary LMISF according to another embodiment of the subject matter described herein.

FIG. 6 is a block diagram illustrating an exemplary LMISF according to another embodiment of the subject matter described herein. In the embodiment illustrated in FIG. 6, the LMISF 54 includes a receiving module 62 operable to receive, from a second LMISF, e.g., the LMISF2 38, a request for information associated with an targeted user equipment, e.g., the UE 20, or subscriber; and a providing module 64 operable to provide, in response to the receiving the request and to the second LMISF, information associated with the targeted UE or subscriber.

Figure 7:
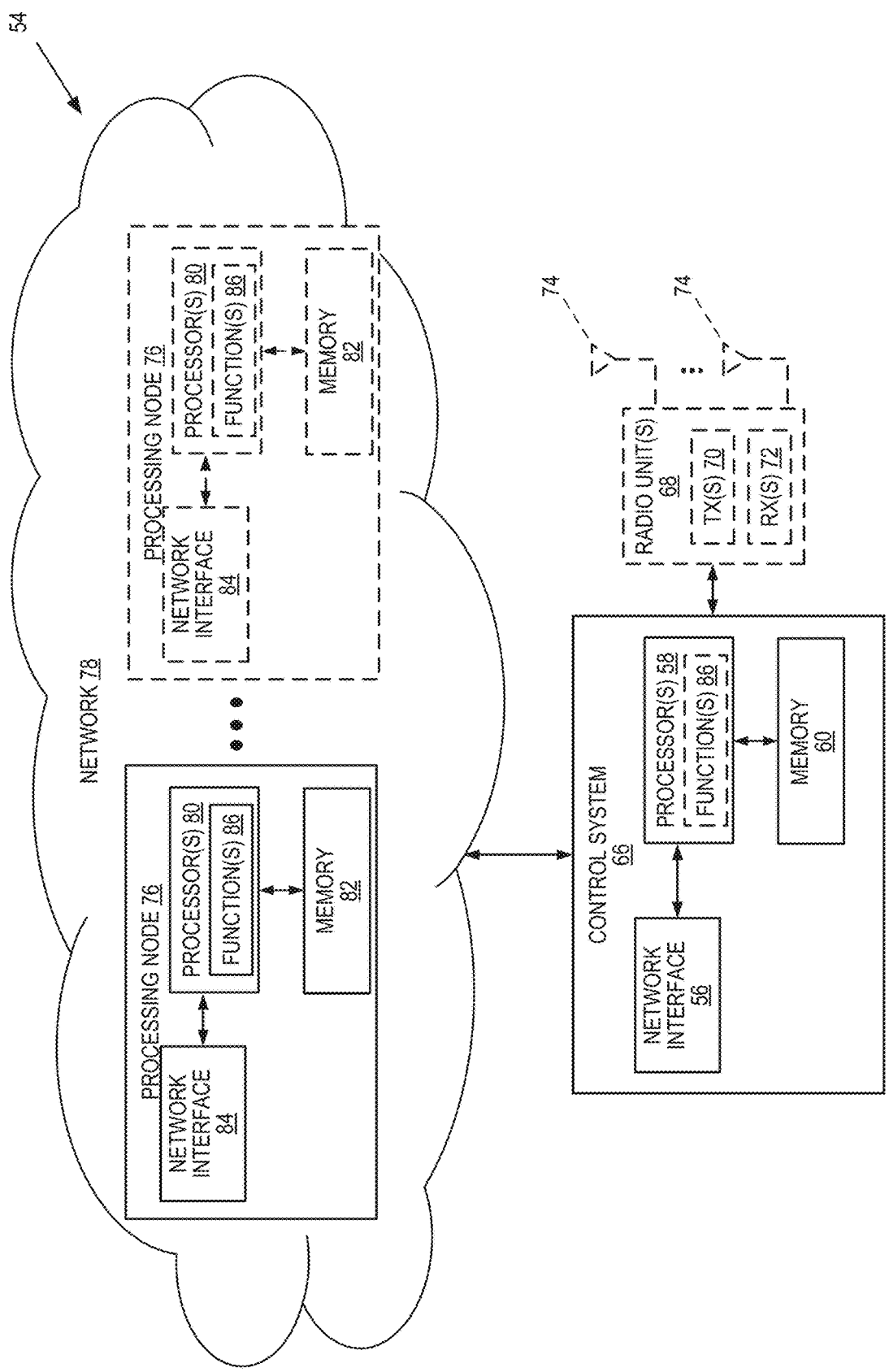
FIG. 7 is a schematic block diagram that illustrates a virtualized embodiment of an LMISF according to some embodiments of the present disclosure.

FIG. 7 is a schematic block diagram that illustrates a virtualized embodiment of the LMISF 54 according to some embodiments of the present disclosure. This discussion is equally applicable to other types of network nodes, such as the MME according to an embodiment. Further, other types of network nodes may have similar virtualized architectures.

As used herein, a "virtualized" network node is an implementation of the LMISF 54 in which at least a portion of the functionality of the LMISF 54 is implemented as a virtual component(s) (e.g., via a virtual machine(s) executing on a physical processing node(s) in a network(s)). As illustrated, in this example, the LMISF 54 includes a control system 66 that includes the one or more processors 58 (e.g., Central Processing Units (CPUs), Application Specific Integrated Circuits (ASICs), Field Programmable Gate Arrays (FPGAs), and/or the like), the memory 60, and the network interface 56. In addition, if the LMISF 54 is a radio network node, the LMISF 54 further includes one or more radio units 68 that each includes one or more transmitters 70 and one or more receivers 72 coupled to one or more antennas 74. The control system 66 is connected to the radio unit(s) 68 via, for example, an optical cable or the like. The control system 66 is connected to one or more processing nodes 76 coupled to or included as part of a network(s) 78 via the network interface 56. Each processing node 76 includes one or more processors 80 (e.g., CPUs, ASICs, FPGAs, and/or the like), memory 82, and a network interface 84.

In this example, functions 86 of the LMISF 54 described herein are implemented at the one or more processing nodes 76 or distributed across the control system 66 and the one or more processing nodes 76 in any desired manner. In some particular embodiments, some or all of the functions 86 of the LMISF 54 described herein are implemented as virtual components executed by one or more virtual machines implemented in a virtual environment(s) hosted by the processing node(s) 76. As will be appreciated by one of ordinary skill in the art, additional signaling or communication between the processing node(s) 76 and the control system 66 is used in order to carry out at least some of the desired functions 86.

Notably, in some embodiments, the control system 66 may not be included, in which case the radio unit(s) 68 communicates directly with the processing node(s) 76 via an appropriate network interface(s). In some other embodiments, the LMISF 54 is entirely virtualized (i.e., does not include the control system 66 or the radio unit(s) 68).

In some embodiments, a computer program including instructions which, when executed by at least one processor, causes the at least one processor to carry out the functionality of LMISF 54 or a node (e.g., a processing node 76) implementing one or more of the functions 86 of the LMISF 54 in a virtual environment according to any of the embodiments described herein is provided.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
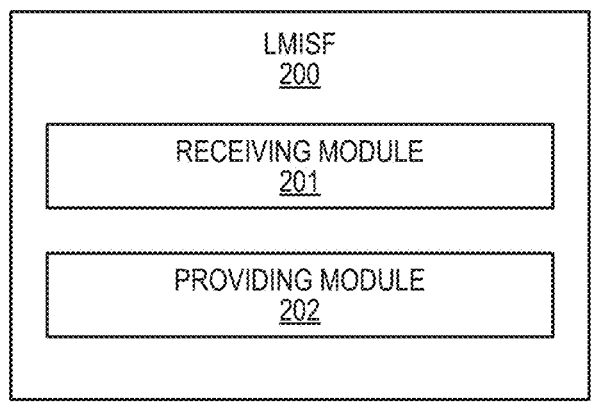
FIG. 8 is a block diagram illustrating an exemplary LMISF according to still another embodiment of the subject matter described herein.

FIG. 8 illustrates an exemplary LMISF 200 according to another embodiment of the subject matter described herein.

In the embodiment illustrated in FIG. 8, the LMISF 200 includes a receiving module 201 operable to receive, from a first SGW, such as SGW 22, serving a wireless communication terminal, e.g. UE 20, IMS-related information of the wireless communication terminal 20 required for performing LI, and a providing module 202 operable to provide, upon the wireless communication terminal 20 relocating to a second SGW serving the wireless communication terminal 20, such as SGW 34, the received IMS-related information of the wireless communication terminal 20 required for performing LI, to a second LMISF, such as LMISF 38, associated with the second SGW 34.

Figure 9:
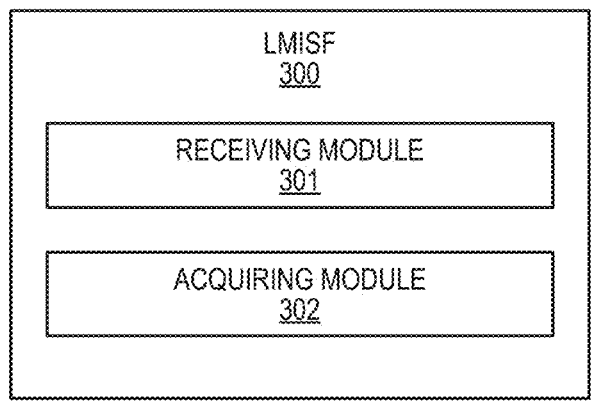
FIG. 9 is a block diagram illustrating an exemplary LMISF according to yet another embodiment of the subject matter described herein.

FIG. 9 illustrates an exemplary LMISF 300 according to another embodiment of the subject matter described herein. In the embodiment illustrated in FIG. 9, the LMISF 300, being an LMISF to which the wireless communication terminal 20 is relocated, such as LMISF2 38, includes a receiving module 301 operable to receive an address of a first LMISF, such as LMISF1 26, that served the wireless communication terminal 20 before the relocation, from an MME (such as MME 42), serving the LMISF 300 via an SGW (such as SGW2 34), and an acquiring module 302 operable to acquire, from the first LMISF, IMS-related information of the wireless communication terminal 20 required for performing LI.

Figure 10:
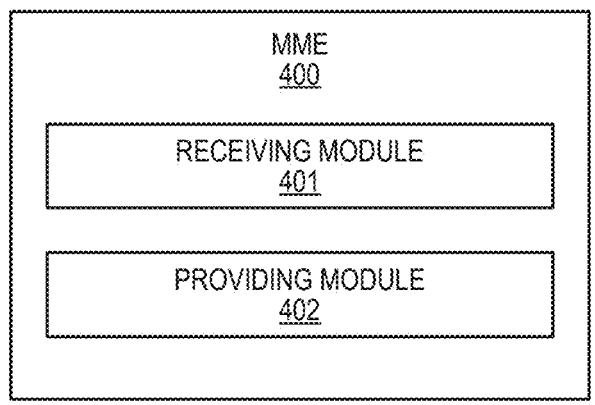
FIG. 10 is a block diagram illustrating an exemplary MME according to an embodiment of the subject matter described herein.

FIG. 10 illustrates an exemplary MME 400 according to another embodiment of the subject matter described herein. In the embodiment illustrated in FIG. 10, the MME 400, such as the MME 42, includes a receiving module 401 operable to receive from a first SGW, such as SGW1 22, an address of a first LMISF, such as LMISF1 26, serving a wireless communication terminal, such as UE 20, and a providing module 402 operable to provide via a second SGW, such as SGW2 34, to a second LMISF, such as LMISF2 38 to which the wireless communication terminal is relocated, the address of the first LMISF, wherein IMS-related information of the wireless communication terminal required for performing LI can be acquired by the second LMISF from the first LMISF.

The methods and systems herein may be extended to address other scenarios which may involve exchanging LMISF addresses generally as well as communication of data from an LMISF to an entity other than an LMISF.

In summary, the solution specifies a method and enhancements to an evolved packet core network used to provide VoLTE in IMS roaming scenarios to allow LI of a VoLTE call in S8HR architecture, in case, due to UE mobility, the SGW involved in the VoLTE call changes.

This is achieved by:
Enhancing the LI architecture by introducing a new LMISF-to-LMISF interface;
Enhancing the existing SGW relocation procedure by storing in the MME the address of the LMISF associated to the SGW;
Enhancing some existing GTPv2 messages by adding LMISF address information; and
Defining a procedure so that a LMISF can contact another LMISF.

While not being limited thereto, some example embodiments of the present disclosure are provided below.

In an embodiment a method of operation of a telecommunications network is provided. The method comprises, at a first LI Mirror Internet Protocol Multimedia Subsystem State Function, LMISF (26), receiving (128), from a second LMISF (38), a request for information associated with an targeted user equipment, UE (20), or subscriber; and in response to receiving the request, providing (130), to the second LMISF (38), the information associated with the targeted UE or subscriber.

In a further embodiment, the information associated with the targeted UE (20) or subscriber comprises a context of the targeted UE.

In yet a further embodiment, the context of the targeted UE comprises an address of at least one of the first LMISF and the second LMISF.

In a further embodiment, the method comprises, prior to receiving the request for information, at a first signaling gateway, SGW (22), serving the targeted UE (20) or subscriber: sending, to a Mobility Management Entity, MME (42), a context for the targeted UE, the context including an address of the first LMISF (26); detecting an Internet Protocol Multimedia Subsystem (IMS) bearer associated with the targeted UE; and in response to detecting the IMS bearer associated with the targeted UE, providing the IMS bearer associated with the targeted UE to the first LMISF (26).

In still another embodiment, the method comprises, prior to receiving the request for information, at the first LMISF (26), receiving a request for performing a LI function related to the target UE (20); and performing the requested LI function related to the target UE.

In yet a further embodiment, the requested LI function comprises interception of a voice call.

In still another embodiment, the method further comprises, at the first LMISF (26), detecting a voice call to be intercepted; and in response to detecting the voice call, notifying a LI Policy Control Function, LPCF (28), that a voice call to be intercepted has been detected, the notification including information that maps LI targets to GTP tunnel identifiers; and at the SGW (22), receiving policy instructions from the LPCF (28); and in response to receiving the policy instructions, sending IMS content to a first Delivery Function, DF.

In a further embodiment, the method further comprises, at the first LMISF (26), sending copies of the SIP messages associated with the voice call to be intercepted to at least one of the first DF or a second DF.

In a further embodiment, the method comprises, prior to receiving the request for information, at the MME (42), receiving a path switch request (114) to migrate the UE (20) from the first SGW (22) to a second SGW (34); and in response to receiving the path switch request, sending, to the second SGW (34), a create session request (116) that includes the address of the first LMISF (26).

In another embodiment, the method further comprises, at the MME (42), receiving, from the second SGW (34), a create session response (122) that includes an address of the second LMISF (38).

In still another embodiment, the method further comprises, sending (126), by the second SGW (34) the address of the first LMISF (26) to the second LMISF (38).

In an embodiment, a Lawful Interception Mirror Internet Protocol Multimedia Subsystem State Function, LMISF (54) is provided, comprising a network interface (56); one or more processors (58); and memory (60) storing instructions executable by the one or more processors, whereby the LMISF is operable to: receive (128), from a second LMISF (38), a request for information associated with a targeted user equipment, UE (20), or subscriber; and in response to receiving the request, provide (130), to the second LMISF (38), the information associated with the targeted UE or subscriber.

In an embodiment, a Lawful Interception Mirror Internet Protocol Multimedia Subsystem State Function, LMISF (54) is provided, the LMISF being adapted to receive (128), from a second LMISF (38), a request for information associated with a targeted user equipment, UE (20), or subscriber; and in response to receiving the request, provide (130), to the second LMISF (38), the information associated with the targeted UE or subscriber.

In an embodiment, a Lawful Interception Mirror Internet Protocol Multimedia Subsystem State Function, LMISF (54), is provided comprising a receiving module (62) operable to receive, from a second LMISF (38), a request for information associated with an targeted user equipment, UE (20), or subscriber; and a providing module (64) operable to provide, in response to the receiving the request and to the second LMISF (38), information associated with the targeted UE or subscriber.

In an embodiment, a non-transitory computer readable medium is provided storing software instructions that when executed by one or more processors of a node cause the node to receive (128), from a LMISF (38), a request for information associated with an targeted user equipment, UE (20), or subscriber; and in response to receiving the request, provide (130), to the LMISF (38), the information associated with the targeted UE or subscriber.

In an embodiment, a computer program is provided comprising instructions which, when executed by at least one processor, cause the at least one processor to receive (128), from a second LMISF (38), a request for information associated with an targeted user equipment, UE (20), or subscriber; and in response to receiving the request, provide (130), to the second LMISF (38), information associated with the targeted UE or subscriber.

The following acronyms are used throughout this disclosure.

3GPP Third Generation Partnership Project
 APN Access Point Name
 ASIC Application Specific Integrated Circuit
 BBIFF Bearer Binding Intercept and Forwarding Function
 CPU Central Processing Unit
 DF Delivery Function
 eNB Enhanced or Evolved Node B
 EPC Evolved Packet Core
 FPGA Field Programmable Gate Array
 GPRS General Packet Radio Service
 GSM Global System for Mobile Communications
 GSMA GSM Association
 GTP GPRS Tunneling Protocol
 GTPv2 GTP Version 2
 HPLMN Home Public Land Mobile Network
 IMS Internet Protocol Multimedia Subsystem
 IP Internet Protocol
 LBO Local Break-out
 LI Lawful Interception
 LMISF LI Mirror IMS state function
 LPCF LI Policy Control Function
 LTE Long Term Evolution
 MME Mobility Management Entity
 P-CSCF Proxy Call/Session Control Function
 PDN Packet Data Network
 PGW Packet Data Network Gateway
 QCI QoS Class Identifier
 QoS Quality of Service
 SA Service Aspects
 S-CSCF Serving Call/Session Control Function
 SGW Serving Gateway
 SIP Session Initiation Protocol
 S8 Interface between SGW and PGW (Inter-operator)
 S8HR S8 Home Routing
 TR Technical Report
 UE User Equipment
 VoLTE Voice over LTE
 VPLMN Visited Public Land Mobile Network Those skilled in the art will recognize improvements and modifications to the embodiments of the present disclosure. All such improvements and modifications are considered within the scope of the concepts disclosed herein.

REFERENCES

[1] GSMA IR.65 IMS Roaming and Interworking Guidelines V.20.0, available at http://www.gsma.com/newsroom/all-documents/httpwww-gsma-comnewsroomwp-contentuploadsir-65-v20-0-pdf/

[2] 3GPP TR 33.827 "Study on Providing for LI in the S8 Home Routing Architecture for VoLTE (Release 14)", v.0.1.0, available at ftp://ftp.3gpp.org/TSG_SA/WG3_Security/TSGS3_LI/2015_61_SanFrancisco/Docs/S3i160192.zip

[3] 3GPP TS 29.274 "3GPP Evolved Packet System (EPS); Evolved General Packet Radio Service (GPRS) Tunnelling Protocol for Control plane (GTPv2-C); Stage 3, v. 13.5.0", available at ftp://ftp.3gpp.org/Specs/archive/29_series/29.274/29274-d50.zip

[4] 3GPP TS 23.401 "General Packet Radio Service (GPRS) enhancements for Evolved Universal Terrestrial Radio Access Network (E-UTRAN) access (Release 13)", v.13.6.1, available at ftp://ftp.3gpp.org/Specs/archive/23_series/23.401/23401-d61.zip

[5] 3GPP TR 33.827 "Study on Providing for LI in the S8 Home Routing Architecture for VoLTE (Release 14)", v.1.1.0.

The invention claimed is:

1. A method of enabling Lawful Interception, LI, when a wireless communication terminal performs S8 Home Routing roaming, comprising:
 receiving, at a first LI Mirror Internet Protocol Subsystem, IMS, State Function, LMISF, from a first Serving Gateway, SGW, serving the wireless communication terminal, IMS-related information of the wireless communication terminal required for performing LI; and
 providing, from the first LMISF upon the wireless communication terminal relocating to a second SGW serving the wireless communication terminal, the received IMS-related information of the wireless communication terminal required for performing LI, to a second LMISF associated with the second SGW;
 wherein the first LMISF and the second LMISF each is configured to determine whether an IMS identity associated with the IMS-related information is a target for LI.

2. The method of claim 1, wherein the IMS-related information of the wireless communication terminal comprises User Equipment, UE, context of the wireless communication terminal.

3. The method of claim 2, the UE context further comprising an address of the first LMISF.

4. The method of claim 1, wherein a performed LI function comprises interception of a voice call.

5. A method of enabling Lawful Interception, LI, when a wireless communication terminal performs S8 Home Routing roaming, comprising:
  receiving, at a Mobility Management Entity, MME, from a first Serving Gateway, SGW, an address of a first LI Mirror Internet Protocol Subsystem, IMS, State Function, LMISF, serving the wireless communication terminal; and
  providing, from the MME via a second SGW to a second LMISF to which the wireless communication terminal is relocated, the address of the first LMISF, wherein IMS-related information of the wireless communication terminal required for performing LI can be acquired by the second LMISF from the first LMISF;
  wherein the first LMISF and the second LMISF each is configured to determine whether an IMS identity associated with the IMS-related information is a target for LI.

6. The method of claim 5, further comprising:
  storing, at the MME, an address of the first LMISF provided by the first SGW as part of a UE context.

7. The method of claim 6, further comprising:
  issuing, by the MME to the second SGW, a create session request, thereby providing the second SGW with the address of the first LMISF.

8. The method of claim 7, further comprising:
  receiving, at the MME in response to the create session request, a create session response including an address of the second LMISF, from the second SGW.

9. A method of enabling Lawful Interception, LI, when a wireless communication terminal performs S8 Home Routing roaming, comprising:
  receiving, at a Mobility Management Entity, MME, serving the wireless communication terminal, an address of a first LI Mirror Internet Protocol Subsystem, IMS, State Function, LMISF, serving the wireless communication terminal; and
  providing, from the serving MME via another MME to which the wireless communication terminal is to be relocated to a second LMISF serving the wireless communication terminal after the relocation, the address of the first LMISF, wherein IMS-related information of the wireless communication terminal required for performing LI can be acquired by the second LMISF from the first LMISF;
  wherein the first LMISF and the second LMISF each is configured to determine whether an IMS identity associated with the IMS-related information is a target for LI.

10. A method of enabling Lawful Interception, LI, when a wireless communication terminal performs S8 Home Routing roaming, comprising:
  receiving, at a second LI Mirror Internet Protocol Subsystem, IMS, State Function, LMISF, to which the wireless communication terminal is relocated, an address of a first LMISF that served the wireless communication terminal before the relocation, from a Mobility Management Entity, MME, serving the second LMISF via a Serving Gateway, SGW, associated with the second LMISF; and
  acquiring, from the first LMISF, IMS-related information of the wireless communication terminal required for performing LI;
  wherein the first LMISF and the second LMISF each is configured to determine whether an IMS identity associated with the IMS-related information is a target for LI.

11. The method of claim 10, further comprising:
  notifying an LI Policy Control Function, LPCF, to which the wireless communication terminal is relocated, that the wireless communication terminal is a target for LI.

12. A first Lawful Interception, LI, Mirror Internet Protocol Subsystem, IMS, State Function, LMISF, configured to enable LI when a wireless communication terminal performs S8 Home Routing roaming, which first LMISF comprises a processor and a memory, said memory containing instructions executable by said processor, whereby the first LMISF is operative to:
  receive, from a first Serving Gateway, SGW, serving the wireless communication terminal, IMS-related information of the wireless communication terminal required for performing LI; and
  provide, upon the wireless communication terminal relocating to a second SGW serving the wireless communication terminal, the received IMS-related information of the wireless communication terminal required for performing LI, to a second LMISF associated with the second SGW;
  wherein the first LMISF and the second LMISF each is configured to determine whether an IMS identity associated with the IMS-related information is a target for LI.

13. The first LMISF of claim 12, wherein the IMS-related information of the wireless communication terminal comprises User Equipment, UE, context of the wireless communication terminal.

14. A Mobility Management Entity, MME, configured to enable Lawful Interception, LI, when a wireless communication terminal performs S8 Home Routing roaming, which MME comprises a processor and a memory, said memory containing instructions executable by said processor, whereby the MME is operative to:
  receive, from a first Serving Gateway, SGW, an address of a first LI Mirror Internet Protocol Subsystem, IMS, State Function, LMISF, serving the wireless communication terminal; and
  provide, via a second SGW to a second LMISF to which the wireless communication terminal is relocated, the address of the first LMISF, wherein IMS-related information of the wireless communication terminal required for performing LI can be acquired by the second LMISF from the first LMISF;
  wherein the first LMISF and the second LMISF each is configured to determine whether an IMS identity associated with the IMS-related information is a target for LI.

15. The MME of claim 14, further being operative to:
  store an address of the first LMISF provided by the first SGW as part of a UE context.

16. The MME of claim 15, further being configured to:
  issue, to the second SGW, a create session request, thereby providing the second SGW with the address of the first LMISF.

17. The MME of claim 16, further being configured to:
  receive, in response to the create session request, a create session response including an address of the second LMISF, from the second SGW.

18. A Mobility Management Entity, MME, serving a wireless communication terminal, configured to enable Lawful Interception, LI, when the wireless communication terminal performs S8 Home Routing roaming, which MME comprises a processor and a memory, said memory containing instructions executable by said processor, whereby the MME is operative to:

receive an address of a first LI Mirror Internet Protocol Subsystem, IMS, State Function, LMISF, serving the wireless communication terminal; and provide, via another MME to which the wireless communication terminal is to be relocated to a second LMISF serving the wireless communication terminal after the relocation, the address of the first LMISF, wherein IMS-related information of the wireless communication terminal required for performing LI can be acquired by the second LMISF from the first LMISF;

wherein the first LMISF and the second LMISF each is configured to determine whether an IMS identity associated with the IMS-related information is a target for LI.

19. A second Lawful Interception, LI, Mirror Internet Protocol Subsystem, IMS, State Function, LMISF, configured to enable LI when a wireless communication terminal performs S8 Home Routing roaming, which second LMISF comprises a processor and a memory, said memory containing instructions executable by said processor, whereby the second LMISF is operative to:

receive an address of a first LMISF that served the wireless communication terminal before relocation of the wireless communication terminal to the second LMISF, from a Mobility Management Entity, MME, serving the second LMISF via a Serving Gateway, SGW, associated with the second LMISF; and acquire, from the first LMISF, IMS-related information of the wireless communication terminal required for performing LI;

wherein the first LMISF and the second LMISF each is configured to determine whether an IMS identity associated with the IMS-related information is a target for LI.

20. The second LMISF of claim 19, further comprising:

notifying an LI Policy Control Function, LPCF, to which the wireless communication terminal is relocated, that the wireless communication terminal is a target for LI.

\* \* \* \* \*